H. F. T. ERBEN & W. J. DELLES.
DYNAMO ELECTRIC MACHINE.
APPLICATION FILED MAR. 19, 1913.

1,156,675.                                                Patented Oct. 12, 1915.

Fig. 3.                    Fig. 4.

Witnesses
Chas B Strkes
J. Ellis Glen.

Inventors
Hermann F. T. Erben
William J. Delles
by
Their Attorney

UNITED STATES PATENT OFFICE.

HERMANN F. T. ERBEN AND WILLIAM J. DELLES, OF SCHENECTADY, NEW YORK, ASSIGNORS TO GENERAL ELECTRIC COMPANY, A CORPORATION OF NEW YORK.

DYNAMO-ELECTRIC MACHINE.

1,156,675. Specification of Letters Patent. Patented Oct. 12, 1915.

Application filed March 19, 1913. Serial No. 755,536.

*To all whom it may concern:*

Be it known that we, HERMANN F. T. ERBEN and WILLIAM J. DELLES, citizens of the United States, residing at Schenectady, in the county of Schenectady, State of New York, have invented certain new and useful Improvements in Dynamo-Electric Machines, of which the following is a specification.

Our invention relates to dynamo electric machines and particularly to such machines provided with compensating windings. In such machines the compensating winding should be placed as near the armature conductors as possible in order to minimize the leakage flux, but at the same time it is desirable that the flux due to the main field winding shall be uniformly distributed over the faces of the field member.

Heretofore the conductors of compensating windings have been arranged in layers in slots in the field member of dynamo electric machines. Such an arrangement requires deep, rectangular slots, which necessitates a much greater depth of the field member than that of a field member of a dynamo electric machine not provided with compensating windings. If a compensating winding is provided in a machine having a field member provided with definite pole pieces, the compensating winding is arranged in slots in the pole faces of the pole pieces, which necessitates deep pole pieces and pole tips large enough to provide room for the slots, because rectangular slots must be placed at such a distance from the pole face as not to choke the flux which tends to pass through that portion of the pole face directly under the slots, and at such a distance from the edges of the pole tips as not to choke the flux which tends to pass around the slots, particularly between them and the edges of the pole tips.

Our invention has for its object to decrease the depth of field members having definite poles and provided with compensating windings, and consists in a novel arrangement of the compensating windings whereby they occupy a minimum space.

The various features of novelty which characterize our invention are pointed out with particularity in the claims annexed to and forming a part of this specification.

For a better understanding of our invention, reference may be had to the following description taken in connection with the accompanying drawing, in which—

Figure 1:
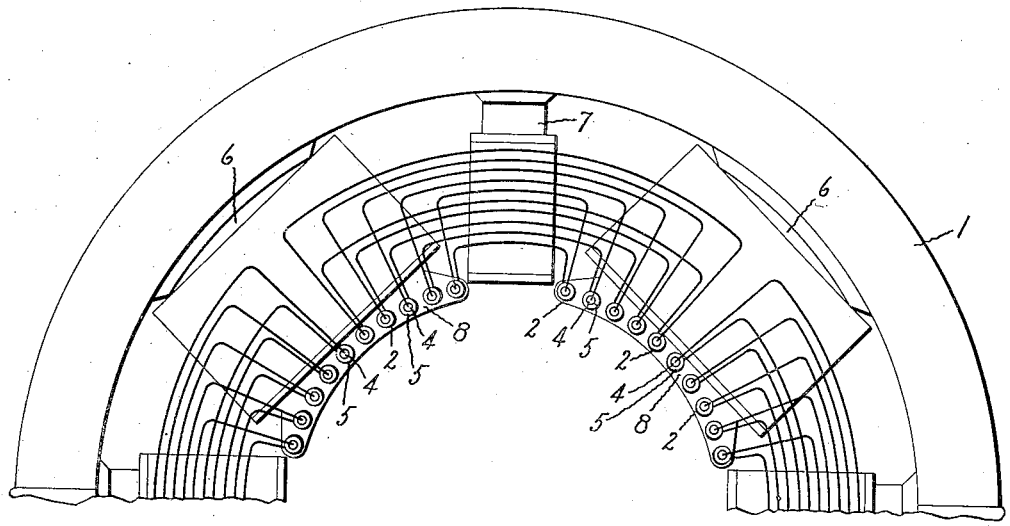
Figure 2:
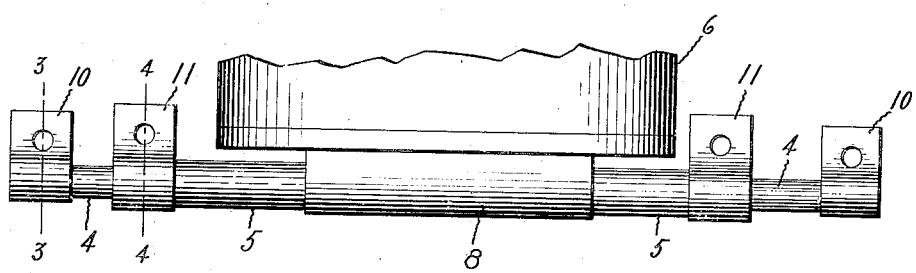
Figure 2:
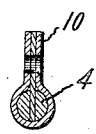
Figure 2:
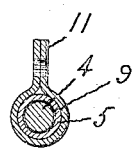

Figure 1 is a diagrammatic view of a dynamo electric machine provided with definite pole pieces and embodying our invention; Fig. 2 is an end view of a pole piece of Fig. 1; Fig. 3 is a sectional view on the line 3—3 of Fig. 2, and Fig. 4 is a sectional view on the line 4—4 of Fig. 2.

Referring to the drawing, 1 is a field member of a dynamo electric machine provided with slots 2 in which a compensating winding is placed. The compensating winding comprises concentric conductors 4 and 5 which are suitably insulated from each other and the slots 2 and are connected up to form a continuous winding.

In the particular construction shown, our compensating winding is applied to a machine of the direct current type, the field member of which has definite main poles 6 and commutating poles 7. The conductors of the compensating winding are placed in the slots 2 in the pole faces 8 of the poles 6. The conductors 4 are substantially cylindrical copper rods, which are surrounded with tubes of mica 9, which in turn are surrounded by substantially cylindrical copper tubes forming the conductors 5. The conductors 5 may be shrunk in place on the tubes of mica 9. The conductors 5 are suitably insulated from the slots 2 as by tubes of insulation. The conductors 4 are longer than the conductors 5. The ends of the conductors 4 and 5 are provided with clips 10 and 11, by means of which these conductors are connected up into a continuous winding by means of connection strips. This is shown diagrammatically in Fig. 1, in which the conductors 4 on one half of each pole are connected in series with the conductors 4 on the adjacent half of the next pole, and also in series with the corresponding conductors 5 on the same halves of both of these poles. The conductors so connected form a set, and in a four pole machine, as shown in the drawing, there will be four such sets. These sets of conductors are all connected in series, but each set is reversed with respect to the adjacent sets. The continuous winding thus formed is connected up in the usual way so as to be supplied with a current which is equal to, or proportional to, the armature current, but which flows in a direction opposite to that in the armature conductors directly opposite them so as to compensate for the armature reaction.

We desire it to be understood that our invention is not limited to the particular arrangement shown and described, and we aim in the appended claims to cover all modifications which do not depart from the spirit and scope of our invention.

What we claim as new and desire to secure by Letters Patent of the United States, is:—

1. In a dynamo electric machine, a field member having definite pole pieces, and a compensating winding arranged in slots in the pole faces and the pole tips of said pole pieces, said compensating winding comprising substantially cylindrical rods and substantially cylindrical tubes surrounding said rods, said tubes being insulated from said rods and said pole pieces.

2. In a dynamo electric machine, a field member having definite pole pieces, and a compensating winding arranged in slots in the pole faces and the pole tips of said pole pieces, said compensating winding comprising substantially cylindrical rods, substantially cylindrical tubes surrounding said rods, said tubes being shorter than said rods and insulated from said rods and said pole pieces, and clips on the ends of said rods and said tubes whereby said rods and tubes are connected up to form a continuous winding.

In witness whereof, we have hereunto set our hands this 18th day of March, 1913.

HERMANN F. T. ERBEN.
WILLIAM J. DELLES.

Witnesses:
BENJAMIN B. HULL,
HELEN ORFORD.